United States Patent [19]

Murata

[11] Patent Number: 5,742,292
[45] Date of Patent: Apr. 21, 1998

[54] SYSTEM AND METHOD FOR REALISTICALLY DISPLAYING IMAGES INDICATING THE EFFECTS OF LIGHTING ON AN OBJECT IN THREE DIMENSIONAL SPACE

[75] Inventor: Katsuyuki Murata, Tokyo, Japan

[73] Assignee: Kabushiki Kaisha Toshiba, Kawasaki, Japan

[21] Appl. No.: 826,102

[22] Filed: Mar. 24, 1997

Related U.S. Application Data

[63] Continuation of Ser. No. 330,867, Oct. 28, 1996, abandoned.

[30]    Foreign Application Priority Data

Oct. 29, 1993  [JP]  Japan ................................. 5-272251

[51] Int. Cl.$^6$ ................................................. G06T 15/50
[52] U.S. Cl. ............................................................ 345/426
[58] Field of Search ........................................ 345/418, 426, 345/427, 429

[56]             References Cited

U.S. PATENT DOCUMENTS

| | | | |
|---|---|---|---|
| 4,709,231 | 11/1987 | Sakaibara et al. | 395/126 |
| 4,866,637 | 9/1989 | Gonzalez-Lopez et al. | 395/126 |
| 4,901,064 | 2/1990 | Deering | 395/126 |
| 4,928,250 | 5/1990 | Greenberg et al. | 395/126 |
| 4,943,938 | 7/1990 | Aoshima et al. | 395/122 |
| 5,083,287 | 1/1992 | Obata et al. | 395/126 |
| 5,299,298 | 3/1994 | Elmquist et al. | 395/121 |
| 5,313,568 | 5/1994 | Wallace et al. | 395/126 |

OTHER PUBLICATIONS

Foley et al.; *Computer Graphics: Principles and Practice;* Second Edition; 1992, pp. 721–813, and 835–840.

Blinn, James F.; *Models of Light Reflection For Computer Synthesized Pictures;* 1977; pp. 192–198.

Kajiya, James T.; *The Rendering Equation;* 1986; pp. 143–150.

Immel et al.; *A Radiosity Method For Non–Diffuse Environments;* 1986; pp. 133–142.

Knox Jr., William J.; *Shading Models For Realistic Image Synthesis;* 1989; pp. 596–603.

Strauss, Paul S.; *A Realistic Lighting Model for Computer Animators;* 1990; pp. 56–64.

Cindy M. Goral, et al., "Modeling the Interaction of Light Between Diffuse Surfaces", Computer Graphics (Siggraph '84), vol. 18, No. 3, Jul. 1984, pp. 213–222.

James F. Blinn, "Me and My (Fake) Shadow", IEEE Computer Graphics and Applications, Jan. 1988, pp. 82–86.

*Primary Examiner*—Joseph H. Feild
*Assistant Examiner*—Rudolph Buchel
*Attorney, Agent, or Firm*—Oblon, Spivak, McClelland, Maier & Neustadt, P.C.

[57]             ABSTRACT

A realistic image display system includes an input section, a storage section, a light source data specifying section, a parameter specifying section, a polygon generating section, an image generating section, and a display section. The polygon generating section generates a set of polygons indicating the effects of a light source on three-dimensional space on the basis of three-dimensional object data including a three-dimensional object, the location of the object in the three-dimensional space, and a three-dimensional object attribute, and parameters specified at the parameter specifying section. The image generating section performs coloring on the three-dimensional object and the set of polygons on the basis of the three-dimensional object data, the light source data, and the parameters, thereby generating a display image.

14 Claims, 10 Drawing Sheets

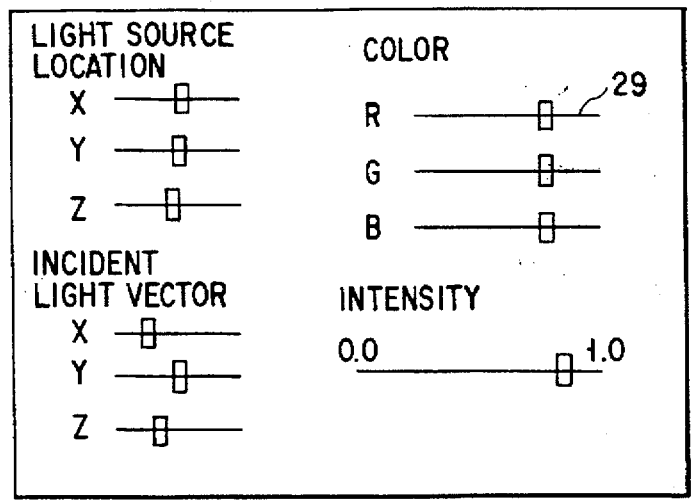
F I G. 3
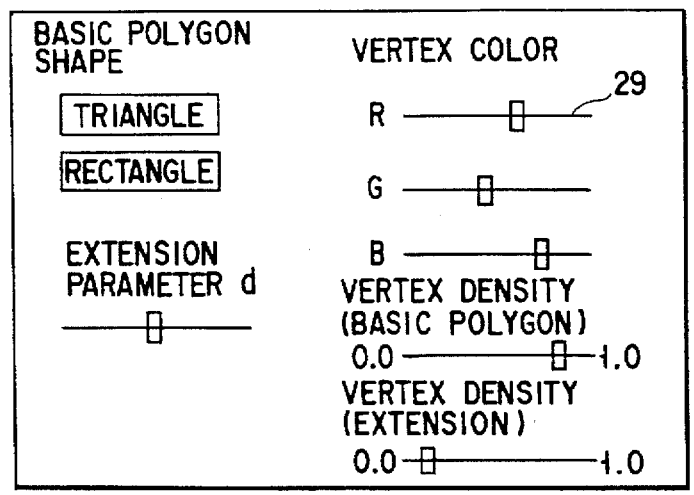
F I G. 4
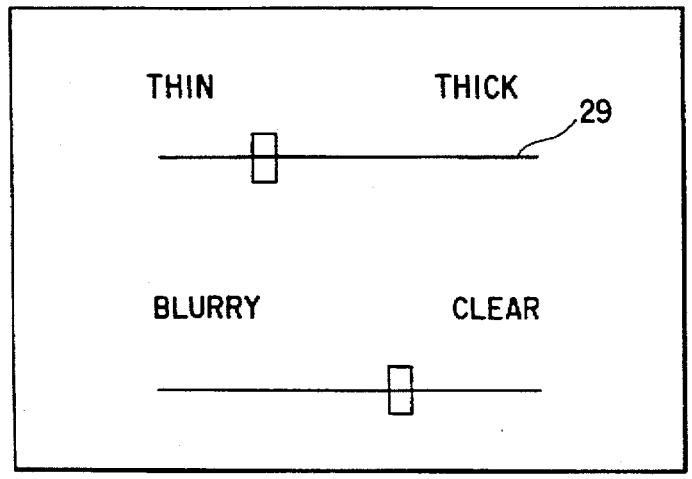
F I G. 5

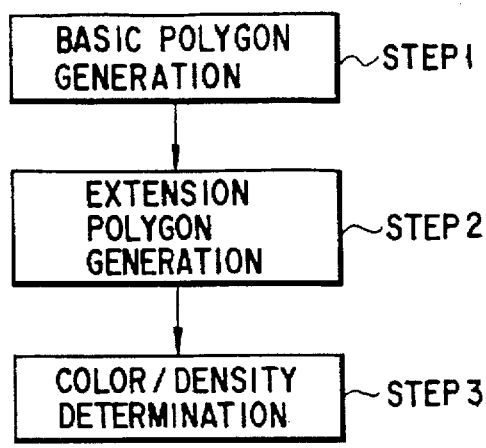
F I G. 6
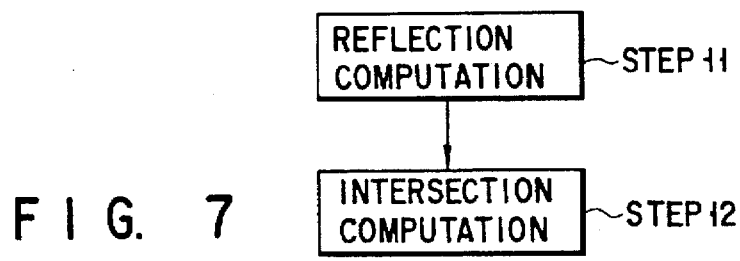
F I G. 7
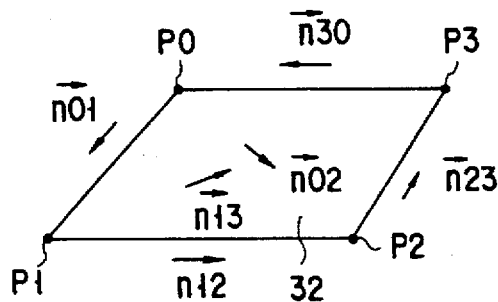
F I G. 8
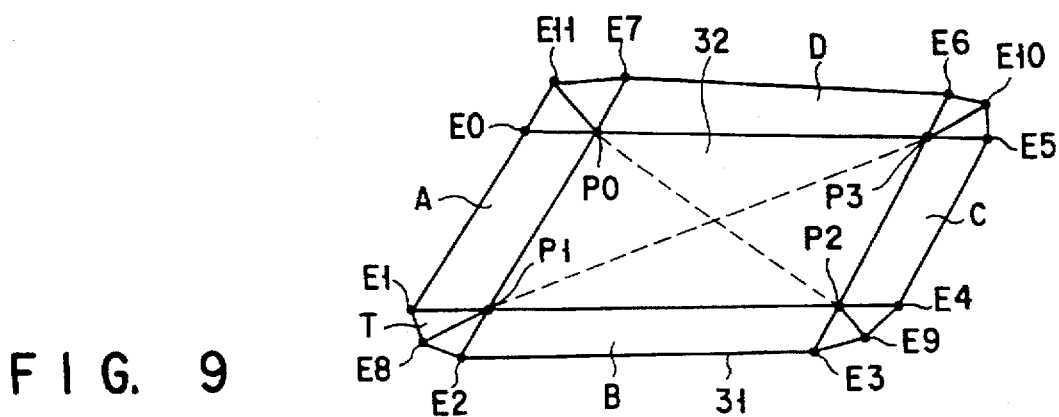
F I G. 9

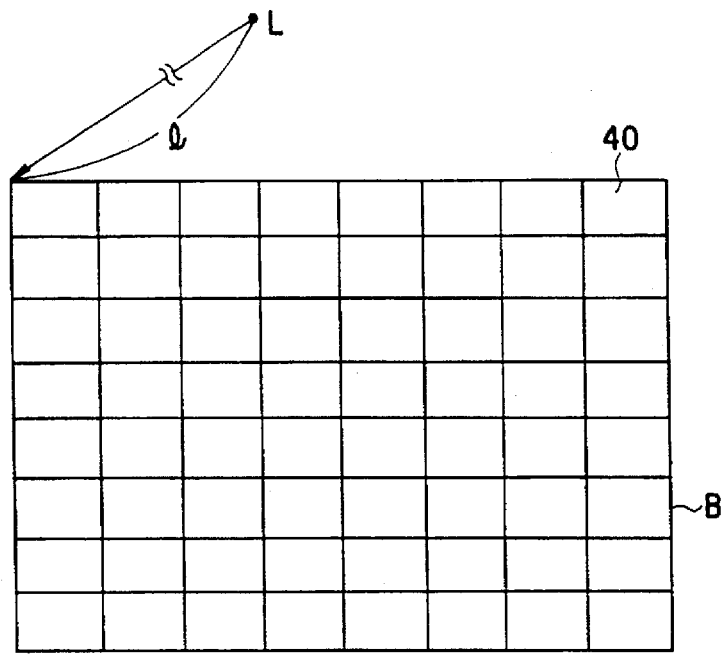
F I G. 18
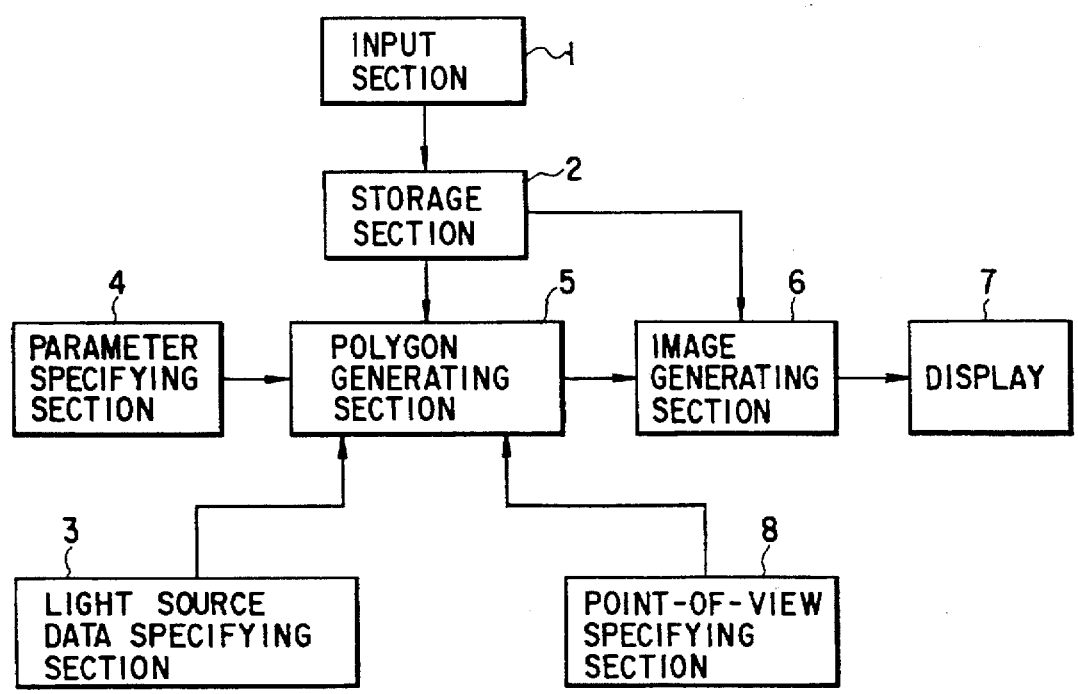
F I G. 19

SYSTEM AND METHOD FOR REALISTICALLY DISPLAYING IMAGES INDICATING THE EFFECTS OF LIGHTING ON AN OBJECT IN THREE DIMENSIONAL SPACE

This is a continuation of application Ser. No. 08/330,867, filed on Oct. 28, 1994, now abandoned.

BACKGROUND OF THE INVENTION

1. Field of the Invention

The present invention relates to a system and method for realistically displaying images representing three-dimensional objects created by the use of an image generating tool such as computer graphics.

2. Description of the Related Art

Heretofore, attempts have been made to display three-dimensional objects through use of computer graphics such as CAD (computer aided design). An example of a three-dimensional object is a room arrangement in a house or office. When an attempt is made to display room arrangement, merely displaying the room arrangement that is represented by polygons will not enable an observer to realize the room arrangement exactly. To remedy this difficulty, shading approaches and light environment displaying approaches, such as the ray tracing method and the radiosity method, have been used to generate images with light phenomena such as object-to-object reflection, mirrored reflection, and shading, thereby displaying more realistic images.

The ray tracing method is a method of generating images with the effects of mirrored reflection and shading utilizing perfect mirrored reflection. With this method, ray tracing is required for a great number of routes between three-dimensional objects and a light source, which involves an overwhelming amount of computation. In addition, since this method is based on perfect mirrored reflection, it cannot generate images with soft shadows. That is, images based on this method will lack reality.

The radiosity method permits the generation of images with soft shadows and illumination effects. This method first makes an approximation of a three-dimensional object with a great number of tiny polygons. Then, an image in energy equilibrium conditions defined by light energy exchange among those polygons is generated. However, this radiosity method requires an overwhelming amount of computation on light energy exchange among many polygons. Thus, it takes a long time to generate images with soft shadows and illumination effects.

As described above, problems with the conventional image generation techniques using the shading and light environment display schemes, which require a long time to generate an image itself, are that, when a change is made from a display image to another, they cannot generate another realistic image immediately and the observer cannot observe a three-dimensional object more realistically.

It is an object of the present invention to provide an image display system and method which permit realistic images to be generated at high speed and allows an observer to observe three-dimensional objects more realistically.

SUMMARY OF THE INVENTION

According to a first aspect of the present invention there is provided a realistic image display system comprising: input means for inputting three-dimensional object data including a three-dimensional object to be located within three-dimensional space containing a light source, the location of the object within the three-dimensional space, and an object attribute indicating optical properties of the object for the light source; storage means for storing the three-dimensional object data from the input means; light source data specifying means for specifying light source data including the location of the light source within the three-dimensional space and a light source attribute indicating illumination properties of the light source; parameter specifying means for specifying parameters for defining the presence of an image to be displayed; means for generating a set of polygons indicating effects of the light source on the three-dimensional space on the basis of the three-dimensional object data, the light source data, and the parameters; image generating means for generating a display image by performing a visible variation on the three-dimensional object and the set of polygons on the basis of the three-dimensional object data, the light source data, and the parameters; and display means for displaying the display image generated by the image generating means.

According to a second aspect of the present invention there is provided a realistic image display method comprising the steps of: specifying parameters for defining ambience furnished to an image to be displayed; generating, on the basis of the parameters, three-dimensional object data including a three-dimensional object in three-dimensional space, the location of the three-dimensional object in the three-dimensional space, and a three-dimensional object attribute indicating optical properties of the object for a light source, and light source data including a light source attribute indicating an illumination property of the light source, a set of polygons indicating the effects of the light source on the three-dimensional object; coloring the three-dimensional object and the set of polygons on the basis of the parameters, the three-dimensional object data, and the light source data to generate a display image; and displaying the display image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a diagram for use in explanation of how to specify light source data;

FIG. 4 is a diagram for use in explanation of how to specify parameters for a set of polygons, FIG. 5 is a diagram for use in explanation of sensory-word-based parameter specification;

FIG. 6 is a flowchart for the polygon generation;

FIG. 7 is a flowchart for the basic polygon generation;

FIG. 8 shows a basic polygon;

FIG. 9 shows a set of polygons;

FIG. 18 illustrates how the effect of direct light is to be displayed;

FIG. 19 is a block diagram of a realistic image display system according to a second embodiment of the present invention;

DETAILED DESCRIPTION OF THE PREFERRED EMBODIMENTS

Figure 1:
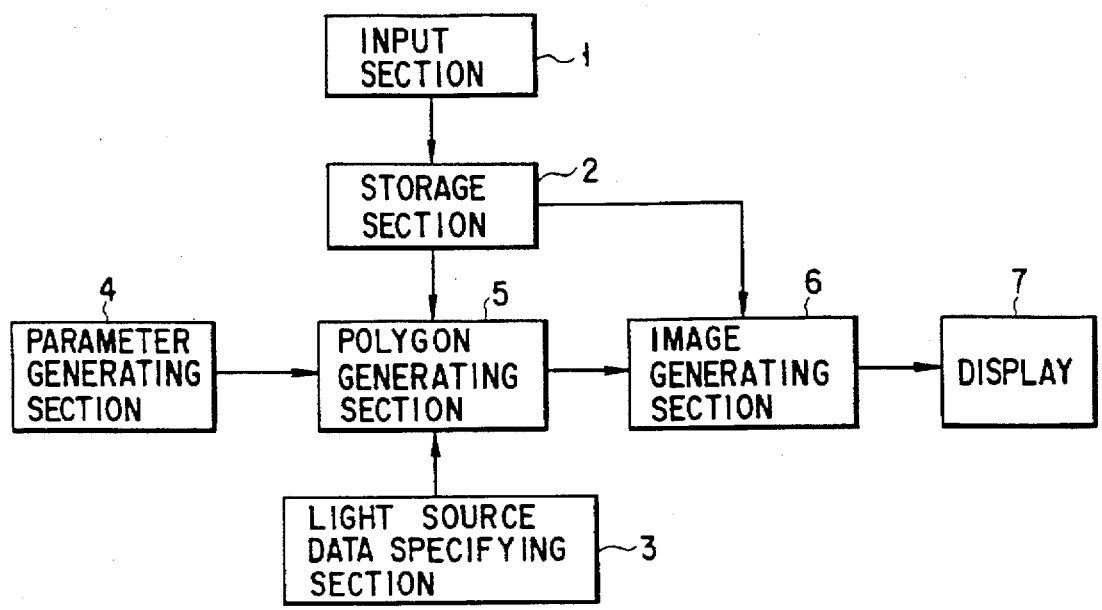
FIG. 1 is a block diagram of a realistic image display system according to a first embodiment of the present invention.
Figure 2:
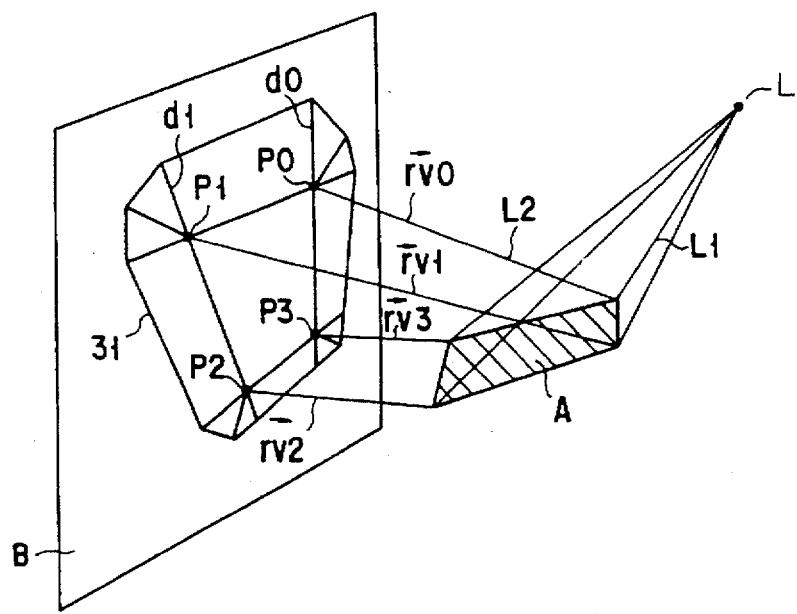
FIG. 2 is a diagram for use in explanation of object-to-object reflections.

Referring now to FIG. 1, there is shown a realistic image display system according to a first embodiment of the present invention, which simulates object-to-object light reflections to generate the ambience (presence) of a light environment for a three-dimensional object such as room arrangement in a house. In FIG. 2, which shows object-to-object reflection, light from a light source L is reflected by a reflecting surface A onto a surface B and that portion of the surface B which is irradiated with the reflected light is represented by a set of polygons indicated at 31.

In FIG. 1, an input section 1 is adapted to enter three-dimensional object data including a three-dimensional object three-dimensional model), such as the room arrangement in a house, produced by CAD, an object location in three-dimensional space, and AN object attribute via an external device. Examples of external devices include networks, storage media such as cartridges, pointing devices such as mice, data gloves, and three-dimensional magnetic sensors.

Here, the object attribute is a material parameter that characterizes material such as metal, wood, plastic, or the like. This material parameter defines light characteristics such as light reflectance.

Note that, in FIG. 2, each of the surfaces A and B is entered via the input section 1. Here, the surface of a desk and the display screen of a desk top computer are typical examples of the surface A and the surface B.

A storage section 2 stores the three-dimensional object data entered via the input section 1.

In a light source data specifying section 3, light source data including the light source location and the direction of light in three-dimensional space, color, and intensity are specified. The light source data can be specified in various ways. That is, the light source data may be read from data files as coordinate data or numerical data. Alternatively, the light source data may be entered by users directly from a keyboard. Further, the light source data may be specified by use of a three-dimensional pointing device consisting of a three-dimensional magnetic sensor or a pointing device such as a mouse.

In addition, such contents as shown in FIG. 3 may be displayed on the screen of a display unit 7 to specify light source data through use of a pointing device. Furthermore, sliders 29 can be moved to specify light source data.

Suppose here that the light source L is a point source of white light and the intensity of light is 1.0 at maximum. The light emitted from the light source L is reflected by the surface A onto the surface B. That is, object-to-object reflection occurs between the surfaces A and B.

In a parameter specifying section 4, parameter values are specified which indicate the shape of a basic polygon and the size of each of extension polygons generated by a polygon generating section 5 and the density given to each of vertexes. These parameter values are needed to generate a set of polygons for creation of the ambience with the object-to-object reflection effects. These parameter values can be specified in various ways. That is, these parameter values may be specified as numerical data from data files, or may be specified by users through a dial or keyboard, or may be automatically determined by a reflection computing method in the case of object-to-object reflection.

To specify parameter values, such contents as shown in FIG. 4 or FIG. 5 may be displayed on the screen on the display unit. In this case, each parameter value is specified by a pointing device or by a corresponding slider 29. In the case of FIG. 4, each parameter value is specified directly. In the case of FIG. 5, on the other hand, sensory words, such as "thin", "thick", "blurry", and "clear", are used for the purpose of specifying parameter values. In this case, for example, the thin/thick axis (let "thin" be 0.0 and "thick" be 1.0 is made to correspond with a parameter by an appropriate computing expression.

In addition, each parameter value can be determined automatically from attribute data entered from the input section 1. In this case as well, a correspondence is established between a material parameter and each parameter by an appropriate computing expression.

A polygon generating section 5 generates a set of polygons adapted to simulate object-to-object reflections on the basis of the parameter values specified in the parameter specifying section 4, the three-dimensional object data stored in the three-dimensional storage 2, and the light source data specified in the light source data specifying section 3.

FIG. 6 illustrates an example of polygon set generation processing by the polygon generating section 5, which comprises a basic polygon generating process (step 1), an extended polygon generating process (step 2), and a color/density determination process (step 3). That is, in the present embodiment, a set of polygons for simulation of object-to-object reflections is composed of a basic polygon and a plurality of extension polygons each of which is produced by extending the basic polygon. This polygon set generation processing is performed so that the whole set of polygons will provide a feeling of blurriness.

Initially, a basic polygon is generated in step 1. Typical examples of basic polygons include triangles, rectangles, parallelograms, and pentagons. In the case of the object-to-object reflection simulation of FIG. 2, the shape of the basic polygon is automatically determined by computing light reflections.

FIG. 7 illustrates an example of basic polygon generation processing for object-to-object reflection simulation, which comprises a reflection computation process (step 11) and an intersection computation process (step 12). First, in the reflection computation process, reflection vectors rv0, rv1, rv2 and rv3 are computed from the incident vectors of the respective rays of light arriving at the vertexes of the surface A from the light source L by means of mirror reflection computation. Note that, in the present description, arrows associated with vectors shown in FIG. 2 are omitted and hence they are simply described like rv0, rv1, etc.

Next, in the intersection computation process, points at which the rays of reflected light computed in the reflection computation process intersect the surface B are obtained. As a result, a rectangle having the resultant intersections as its vertexes P0, P1, P2 and P3 is obtained. This rectangle is subsequently used as a basic polygon for object-to-object reflection simulation.

FIG. 8 shows an example of a basic polygon 32 to be generated. This basic polygon 32 is defined by coordinate data of the vertexes P0, P1, P2, and P3. From these coordinate data are determined unit vectors n01, n12, n23, and n30 along the respective sides of the rectangle and unit vectors n02 and n13 along the respective diagonals of the rectangle. In this case as well, though shown in FIG. 8, arrows associated with the vectors are omitted in the description.

Next, in the extension polygon generation process, several extension polygons are generated which extends the basis polygon 32 generated by the basic polygon generation process. In FIG. 9 there is illustrated an example of a set of polygons when extension polygons are generated to the basic polygon of FIG. 8.

The extension polygons of FIG. 9 are composed of four extension rectangles A, B, C and D for the respective sides of the basic polygon and eight extension triangles T each pair of which is inserted between an extension rectangle and the adjacent extension rectangle.

Assume now that a parameter representing the size of extension specified in the parameter specifying section 4 is d. Then, vertexes E0 and E1 of the extension rectangle A defined by vertexes P0, E0, E1, and P1 will be obtained by $$E0 = P0 + d \times n30 \quad (1)$$

$$E1 = P1 + d \times n12 \quad (2)$$

The corresponding vertexes (E2, E3; E4, E5; E6, E7) of other extension rectangles B, C and D will also be obtained in the same way as E0 and E1.

Next, the extension triangles T are generated which are to be embedded in gaps between every extension rectangle. For example, the triangle defined by vertexes P1, E1, and E8 and the triangle defined by vertexes P1, E8, and E2, which are to be embedded in the gap between the extension rectangles A and B, will be determined when the vertex E8 common to these triangles is obtained by $$E8 = P1 - d \times n13 \quad (3)$$

The other extension triangles are also obtained in the same way.

Figure 10:
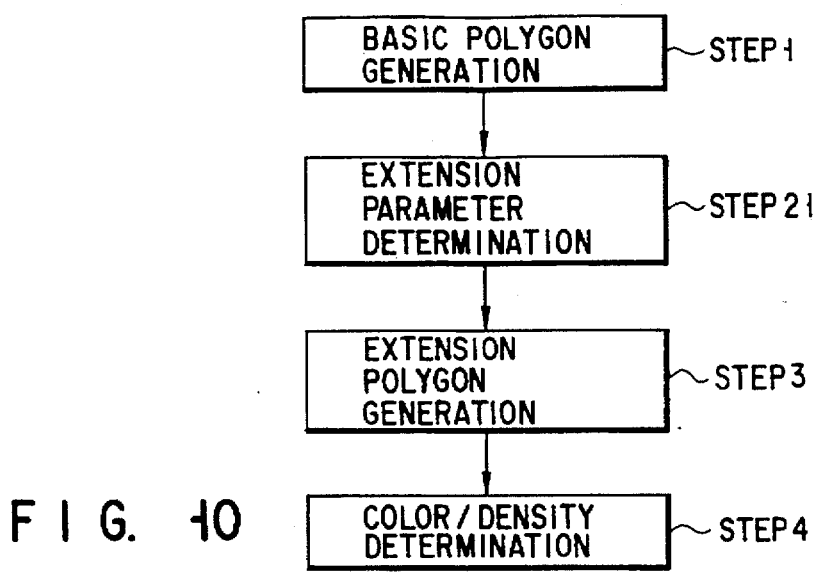
FIG. 10 is a flowchart for the polygon generation.

The value for the parameter d representing the size of extension may be determined by users in the parameter specifying section 4. Alternatively, as shown in FIG. 10, an extension parameter determination process (step 21) may be implemented between the basic polygon generation process (step 1) and the extension polygon generation process (step 2), whereby the parameter d which is dependent upon the shape of a basic polygon is computed. For example, assuming a basic polygon to be a rectangle and taking the length of its diagonal to be 1, the extension parameter d is determined in 1-dependent form as follows:

$$d = C \times 1 \quad (4)$$

where C is a constant. In this case, it is also possible to specify the constant C in the parameter specifying section 4.

Figure 11A:
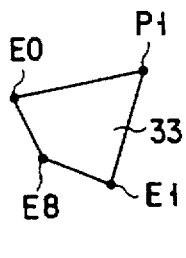
FIGS. 11A and 11B show examples of extension polygons.
Figure 11B:
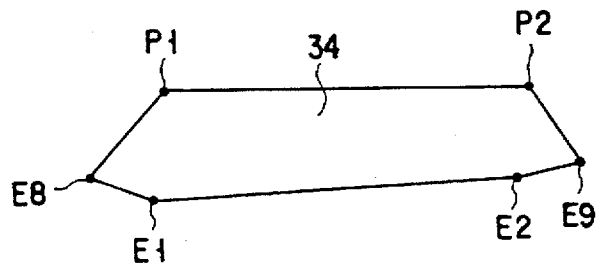
Figure 12:
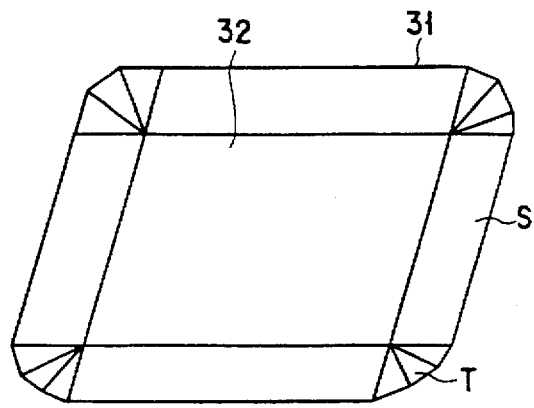
FIG. 12 shows still another example of an extension polygon.

A pair of extension triangles can be defined as a single polygon. For example, the triangle defined by the vertexes P1, E1, and E8 and the triangle defined by the vertexes P1, E8, and E2 may be taken together as an extension polygon comprised of vertexes P1, E1, E8, and E2 as shown in FIG. 11A. Alternatively, an extension rectangle and two extension triangles may be taken together to define a single hexagon comprised of vertexes P1, E8, E2, E3, and P2 as shown in FIG. 11B. Also, the number of extension triangles T may be increased so as to make the contour of gaps between every extension rectangle S smoother as shown in FIG. 12.

Next, in the color/density determination process (step 3), each of the vertexes (P0 to P3, E0 to E11) of the polygons generated by the basic polygon generation process (step 1) and the extension polygon generation process (step 2) is given a color and density.

Here, in FIG. 2, for example, the density refers to the rate at which a color (background color) of the surface B and a color of the set of polygons are blended. If the color of the light source has been specified to be white in the light source specifying section 3, then each of the vertexes P0 to P3 and E0 to E11 will be given white color (R, G, B)=(255, 255, 255). If, in the parameter specifying section 4, the density of the vertexes of the basic polygon has been specified to be 1.0 and the density of the extension vertexes (outside vertexes of the polygon set) has been specified to be 0.0, then each of the vertexes P0 to P3 will be given an alpha value (blend rate) α=255 and each of the vertexes E0 to E11 will be given α=0.

The density parameter may be specified in the parameter specifying section 4 as described above, but it can also be computed from arithmetic expression (5) below.

For object-to-object reflection display, let the density at each of vertexes of the set of polygons represent the intensity of incident light. The intensity of incident light depends on the intensity of a light source, the decay of light that is dependent on distance over which light propagates, and absorption of light by a reflecting surface. Assume here that the intensity I0 of a light source is 1.0 and the intensity of incident light has a range of 0.0 to 1.0. The intensity of incident light is made to correspond with the density at a vertex. For example, in FIG. 2, the density ρ at the vertex P0 of the basic polygon, i.e., the intensity I of incident light arriving at the vertex P0, is computed by $$\rho = I = D \times I0 \ (L \times L) \quad (5)$$

where D=constant, L=L1+L2, and β=reflectance of the surface A that is stored in the storage section 2. The density at each of the vertexes P1 to P3 can be computed likewise.

Figure 13:
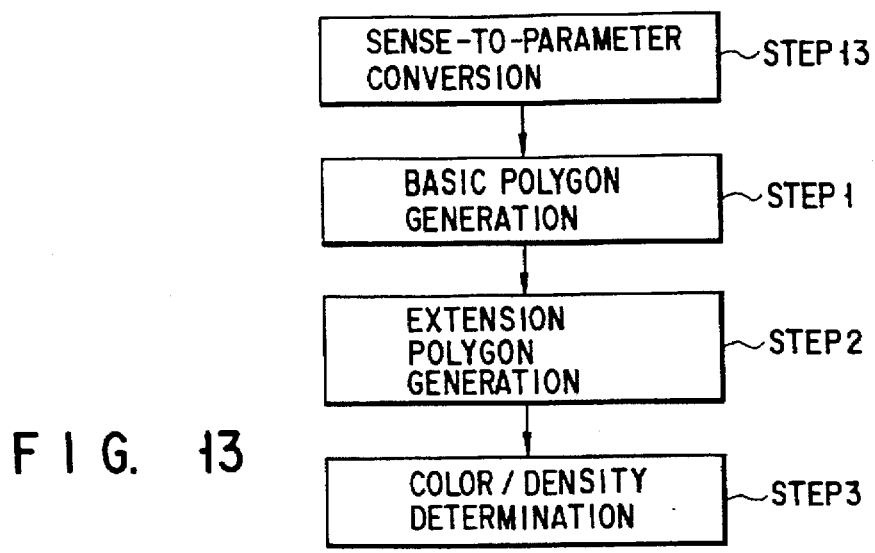
FIG. 13 is a flowchart for the generation of a polygon.

FIG. 13 illustrates an example of processing of generating a set of polygons when sensory words are used to specify parameters in the parameter specifying section 4. A sense/parameter conversion process (step 13) is implemented prior to the basic polygon generation process (step 1) in the above-described polygon set generation processing of FIG. 6, whereby the value of each parameter for a corresponding sensory word is determined by computation.

In this conversion process (step 13, the density parameter value given to each vertex of the basic polygon is varied linearly on the axis of sensory words of "thin" and "thick". Also, the value of each of extension parameters for the generation of extension polygons is varied linearly on the axis of sensory words of "clear" and "blurry". In addition, for a complex word such as "slightly dim", two or more parameter values may be combined.

Figure 14:
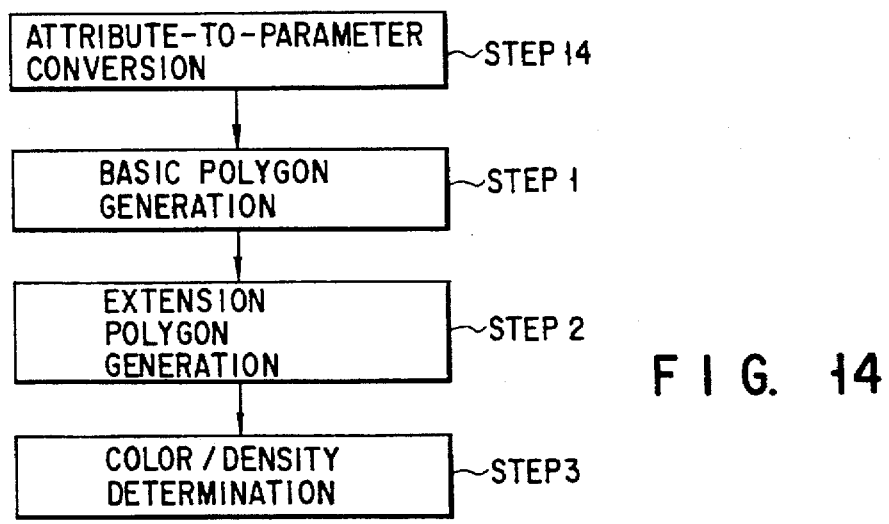
FIG. 14 is a flowchart for the generation of a polygon.

FIG. 14 illustrates an example of polygon set generation processing when the attribute (e.g., reflection characteristics) of a three-dimensional object which is stored in the three-dimensional storage 2 is reflected in a set of polygons. A attribute/parameter conversion process (step 14) is implemented prior to the basic polygon generation process (step 1) in the above-described polygon set generation processing of FIG. 6, whereby the value of each of parameters for the three-dimensional object attribute is determined.

For example, it is possible to reflect the effect of the material of a reflecting surface in a parameter, d, representing the size of extension. If, in FIG. 2, the surface B or A is made of material that is easy to diffuse light, then the parameter d should be made to have a large value. For the attribute/parameter conversion process, a correspondence should have been established between C in expression (4) and material data (e.g., reflectance).

When an extension polygon is generated from the vertex P0 in FIG. 2, d is calculated so that it will depend on the distance L2, thereby producing a sense of distance. This is due to the fact that, when the distance from the reflecting surface A is short, not only is there an increase of the intensity of incident light arriving at the surface B, but also the region into which light diffuses becomes narrow. Consequently, this will be reflected in the size of a resultant extension polygon.

Figure 15:
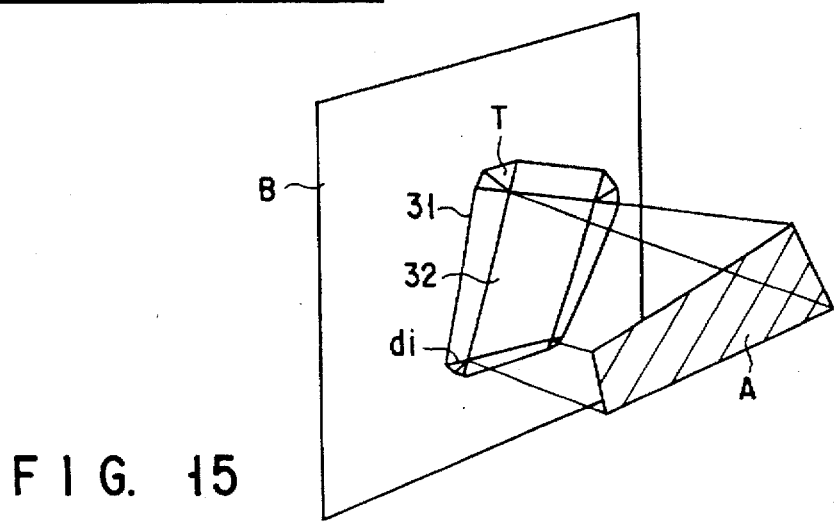
FIG. 15 is a diagram for use in explanation of a sense of distance in object-to-object reflection.

FIG. 15 illustrates this situation. A parameter di for determining the size of each extension polygon T generated from each vertex of a basic polygon T is computed from the distance between a corresponding vertex and the reflecting surface A. For example, a relational expression is set up so that di will become smaller as the distance becomes shorter.

Referring back to FIG. 1, the image generating section 6 performs shading on the set of polygons generated by the polygon set generating section 5 on the basis of the color and density given to each vertex, for example, by linear interpolation of colors and densities at adjacent vertexes, and on the three-dimensional object stored in the storage 2 in accordance with stored data and then combines the resultant set of polygons and the resultant three-dimensional object to generate an image to be displayed.

As a result, such an image as shown in FIG. 2 is generated. In this image, the color of the background surface B and the color of the set of polygons are blended within the area where the polygons are generated, thus producing the effect of shading off.

A display unit 7, such as a cathode ray tube (CRT), displays the image generated by the image generating section 6.

Figure 16:
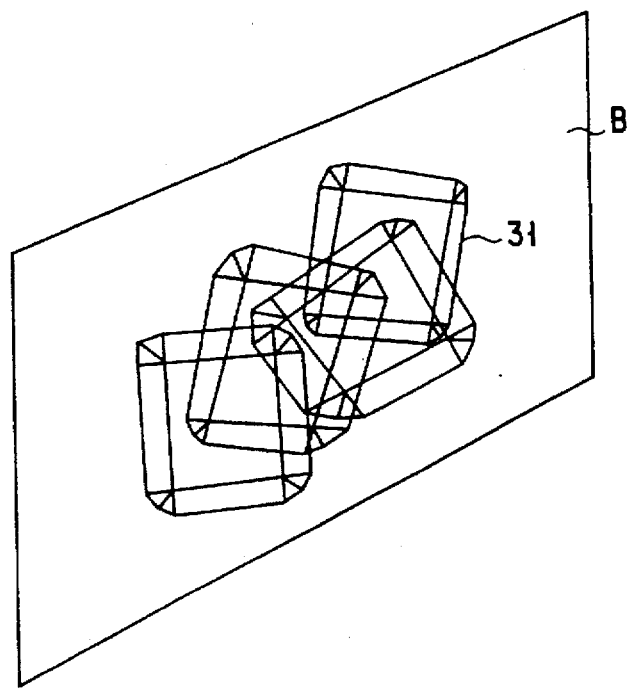
FIG. 16 shows a state in which multiple sets of polygons are displayed.

More complex shading effects can be represented to enhance reality by generating multiple sets of polygons and superimposing each set of polygons on top of the other on the background surface as shown in FIG. 16.

Figure 17:
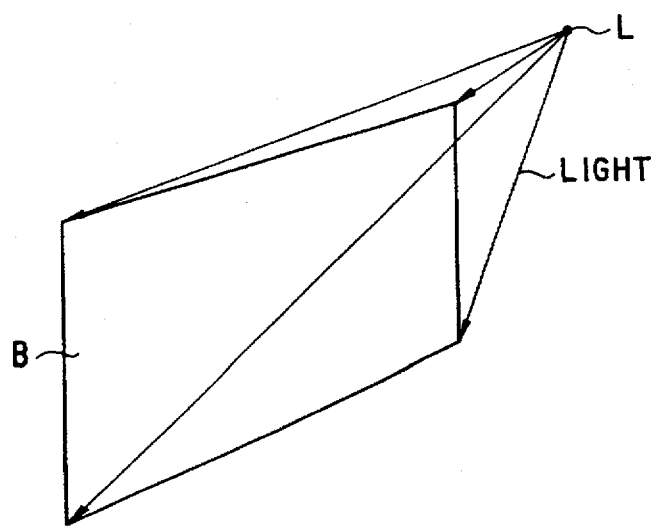
FIG. 17 shows the effect of direct light.

In addition, if not only reflected light from the surface A but also light directly arriving at the surface B from the light source is taken into consideration as shown in FIG. 17, then a more realistic image will be displayed.

In FIG. 18 there is illustrated an example in which light directly arriving at the surface B is computed and displayed. In this case, the surface B is divided into patches 40. The distance from the light source is computed for each vertex of every patch. The intensity of light is computed such that it is in inverse proportion to the square of the distance as with expression (5). All the patches are shaded with the intensity of light incident on each vertex taken as the density at it.

As described above, the present embodiment is equipped with parameter specifying means which allows an operator to specify parameters for controlling the shape and color of a set of polygons which represent the reflection of a light source onto a three-dimensional object. Further, the polygon set generating means generates a set of polygons on the basis of these parameters, and the image generating means colors the set of polygons thus generated. Therefore, the operator is allowed to alter the parameters properly so as to furnish an image representing the reflection of a light source with desired reality.

Next, a description will be made of a realistic image display system according to a second embodiment of the present invention. This system simulates mirrored reflection of a surface light source onto an object surface to thereby produce the ambience of a light environment in three-dimensional space such as a room.

The mirrored reflection is clear or blurry, depending on the material of a reflecting surface. This indicates a degree of diffusion of light at the surface and depends on the microscopic property of the material of the surface. The mirrored reflection simulation in this embodiment generates a sense of material with reality with a set of polygons and its parameters.

FIG. 19 is a block diagram of the present system, which, unlike the system of FIG. 1, is equipped with a point-of-view specifying section 8 for specifying data on the location of a point of view.

Figure 20:
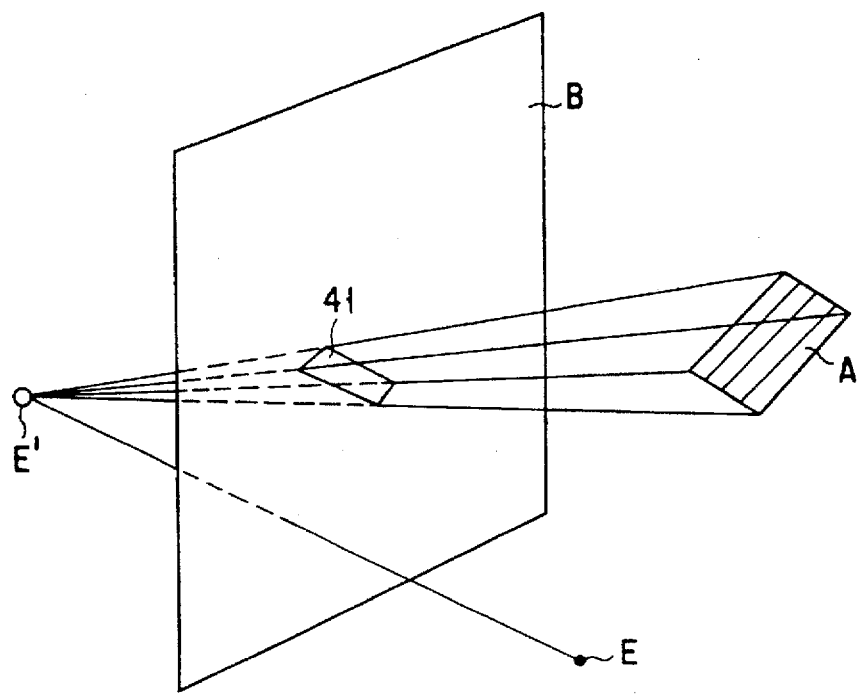
FIG. 20 shows mirrored reflection.

FIG. 20 is a diagrammatic representation of a mirrored reflection. Surfaces A and B are three-dimensional objects stored in the storage section 2 of FIG. 19. E denotes a point of view the location of which is specified at the point-of-view specifying section 8. The surface A is a surface light source.

With the mirrored reflection simulation, a basic polygon is generated using a method of image. In FIG. 20, first, a point E' of symmetry of the point E with respect to the surface B is obtained by computation. Next, straight lines connecting the point E' with the vertexes of the surface A and intersections of the straight lines and the surface B are obtained. Finally, a rectangle having the intersections as its vertexes is generated, which serves as a basic polygon 41 for mirrored reflection simulation.

The generation of extension polygons and the determination of color/density may be performed in the same manner as in the case of the above-described object-to-object reflection simulation.

Thus, according to the present embodiment, an operator can alter parameters properly to furnish an image representing mirrored reflection of a light source with desired reality.

Next, a description will be made of a system according to a third embodiment of the present invention, which simulates the shadow of objects to thereby create the ambience of a light environment in three-dimensional space such as a room.

When a light source is a surface light source, the shadow of an object consists of a main shadow and a subshadow. The subshadow around the main shadow produces the softness of the whole shadow. The present shading simulation enables the effects of a subshadow based on a surface light source to be produced with reality.

A block diagram of the present system is the same as that of FIG. 1. However, the process of generating a basic polygon for the simulation of a shadow and the color given to each of vertexes of polygons differ.

Figure 21:
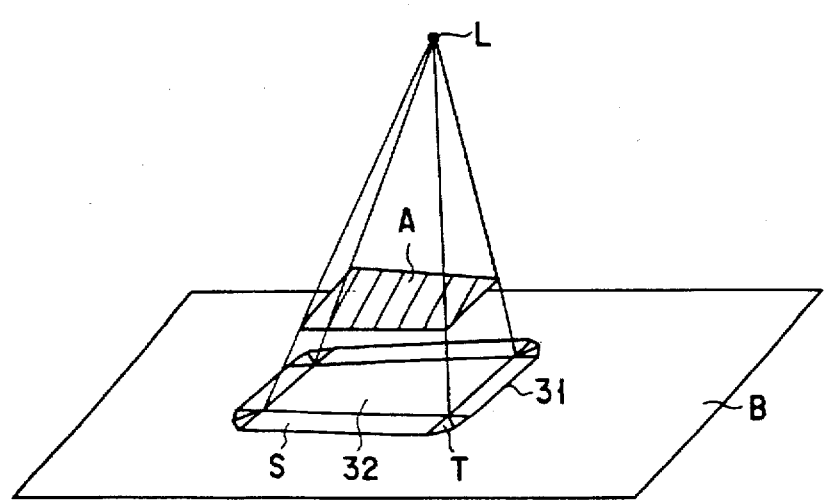
FIG. 21 is a diagram for use in explanation of shading.

FIG. 21 is a diagrammatic representation of shading. Surfaces A and B indicate three-dimensional objects stored in the three-dimensional storage section 2, and a light source L is a point light source specified at the light source data specifying section.

As shown in FIG. 21, a basic polygon 32 adapted to shading simulation is generated by projecting the surface A onto the surface B with rays of light emitted from the point light source L. That is, the shading basic polygon is generated by obtaining intersections of straight lines, connecting the light source L with the vertexes of the surface A, and the surface B and generating a rectangle having the intersections as its vertexes.

The generation of extension polygons S and T and the determination of their color and density may be performed as in the case of the above-described object-to-object reflection simulation. These polygons represent a shadow and hence the color given to each vertex should be black.

Figure 22:
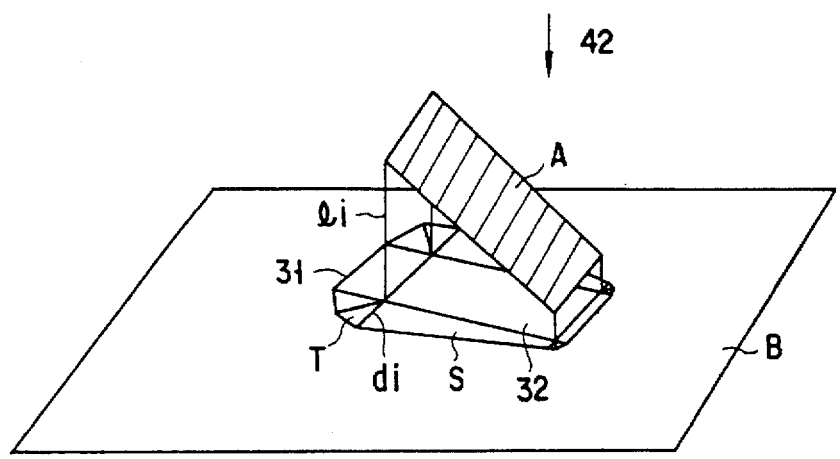
FIG. 22 is a diagram for use in explanation of a sense of distance in shading.

In the generation of polygons, it is possible to produce a sense of distance between an object that casts a shadow and an object over which the shadow is cast. FIG. 22 illustrates the production of a sense of distance with polygons 31. In generating the extension polygons S and T, use is made of an extension parameter di depending on (e.g., is in proportion to) the distance li between each vertex of the basic polygon 32 and a corresponding vertex of the surface A. A sense of distance can also be produced by the density of a shadow. As with the parameter di, the density is determined such that it depends on (e.g., is in reverse proportion to the square of) the distance between each vertex of the basic polygon 32 and a corresponding vertex of the surface A.

Finally, clipping of polygons by a three-dimensional object (surface) within space will be described taking shading by way of example.

Figure 23:
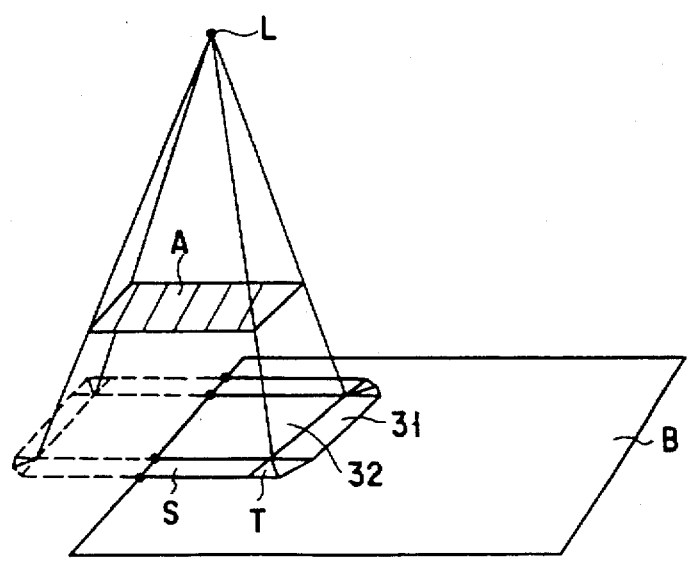
FIG. 23 illustrates shadow clipping.
Figure 24:
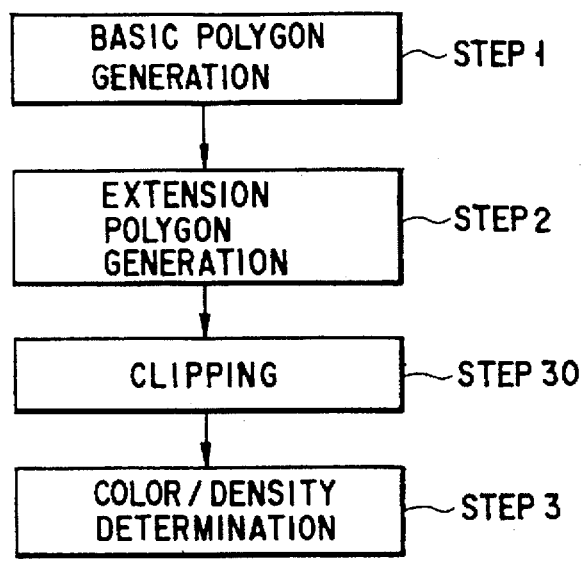
FIG. 24 is a flowchart for the polygon generation.

FIG. 23 illustrates a condition in which the shadow of a surface A is clipped by a surface B. In this case, to generate final polygons 31, such a procedure as shown in FIG. 24 is performed. That is, a basic polygon 32 is generated (step 1), extension polygons S and T are generated (step 2), and then clipping of each of the polygons thus generated by the surface B is performed (step 30). The clipping is performed by obtaining intersections of sides of each polygon and a side of the surface B by way of example.

Figure 25:
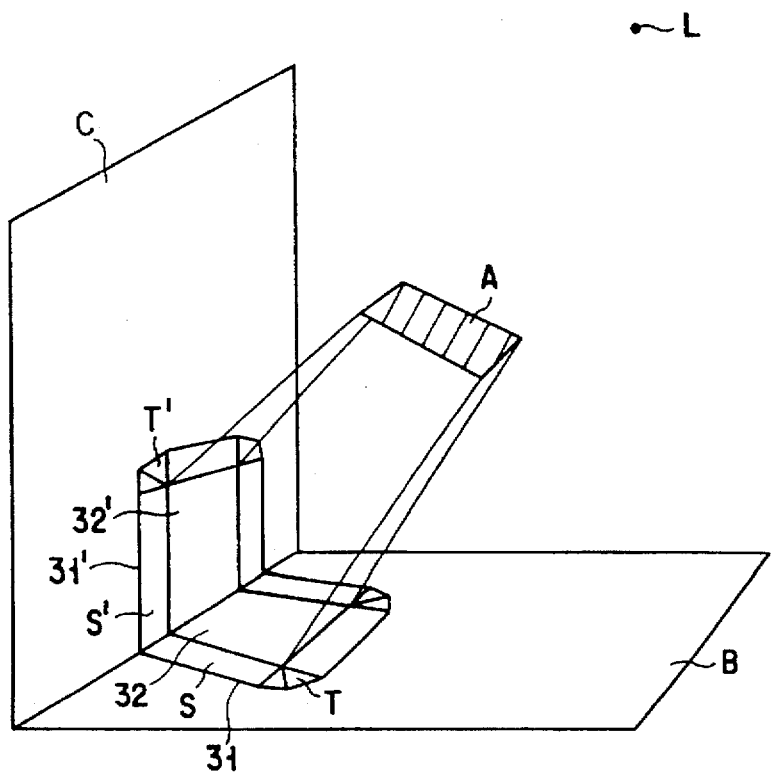
FIG. 25 shows a state in which shadows are clipped.

FIG. 25 illustrates a condition in which the shadow of a surface A is clipped by surfaces B and C. In this case, a basic polygon 32; 32' and extension polygons S and T; S' and T' are generated for each of the surfaces B and C. Clipping by the surface B is performed on the polygons 31 generated for the surface B and clipping by the surface C is performed on the polygons 31' generated for the surface C. Subsequently, the determination of color and density is made (step 3).

Thus, with the present embodiment, the operator can alter the parameters properly to furnish an image representing shadows with desired reality.

As can be understood from the foregoing, the present invention, used with a system which determines interactively the location of three-dimensional objects within room-like three-dimensional space produced by computer graphics and evaluates and verifies the space environment, can provide users with realistic image data and moreover permits users to alter the ambience of the space on the spot on the basis of their respective sense and experience.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A realistic image display system comprising:

storage means for storing three-dimensional object data defining a three-dimensional object to be located within three-dimensional space containing a light source, the location of said object within said three-dimensional space, an object attribute indicating optical properties of said object for said light source, light source data including the location of said light source within said three-dimensional space, a light source attribute indicating illumination properties of said light source, and parameters of an image to be displayed;

polygon generating means for generating a basic polygon and a set of extension polygons indicating effects of said light source on said three-dimensional space in accordance with a computing process which uses said light source data, said parameters, the three dimensional object, the location of said object, and the object attribute of said object, said set of extension polygons being generated by defining vertices of the extension polygons using vertices of the basic polygon added to vectors defining the basic polygon having a magnitude based on said parameters of the image to be displayed;

image generating means for generating a display image using said three-dimensional object and said set of polygons on the basis of said three-dimensional object data, said light source data, and said parameters; and display means for displaying said display image generated by said image generating means.

2. The system according to claim 1, wherein said image generating means includes means for performing a coloring process for at least one of shading, object-to-object reflection and mirrored reflection on said three-dimensional object data and said light source data.

3. The system according to claim 2, wherein said image generating means includes means for performing a coloring process for color and density on said three-dimensional object and said set of polygons on the basis of said three-dimensional object data and said light source data.

4. The system according to claim 1, further comprising:

parameter specifying means for specifying shape parameters defining the shape of said polygons generated by said polygon generating means.

5. The system according to claim 1, further comprising:

parameter specifying means includes means for specifying parameters of an image to be displayed using sensory words.

6. The system according to claim 1, further comprising means for specifying the direction of a point of view for an image to be displayed.

7. The system according to claim 1, wherein the polygon generating means comprises:

means for generating the set of extension polygons using vertices which are two coordinates of the basic polygon and two coordinates defined by the said vertices of the extension polygons.

8. The system according to claim 1, wherein the polygon generating means comprises:

means for generating the vertices of the extension polygons using the formula:

$$EX = PX + d \times nY$$

where:

EX is a vertex of one of the extension polygons,

PX is a corresponding vertex of the basic polygon, d is a parameter controlling a size of an extension to the basic polygon, and nY is a vector specifying a direction along one of a side of the basic polygon and a diagonal of the basic polygon.

9. The system according to claim 8, wherein: nY has a unit magnitude.

10. A realistic image display method comprising the steps of:

specifying parameters for defining an image to be displayed;

generating, in accordance with a computing process which uses said parameters, three-dimensional object data defining a three-dimensional object in three-dimensional space, the location of said three-dimensional object in said three-dimensional space, and a three-dimensional object attribute indicating optical properties of said object for a light source, and light source data including a light source attribute indicating an illumination property of said light source, a set of polygons indicating the effects of said light source on said three-dimensional object, said set of polygons including a basic polygon and a set of extension polygons, said set of extension polygons being generated by defining vertices of the extension polygons using vertices of the basic polygon added to vectors defining the basic polygon having a magnitude based on said parameters; and coloring said three-dimensional object and said set of polygons on the basis of said parameters, said three dimensional object data, and said light source data to generate a display image.

11. A display system, comprising:

a memory which stores data defining a three-dimensional object including a location of the object and reflective properties of the object, and which stores data defining a light source including a location of the light source and illumination properties of the light source;

a device which generates, using the data stored in the memory, an image which includes a reflection off of the object, the reflection off of the object including both a basic reflection defined by a basic polygon and an extension reflection defined by a set of extension polygons, said set of extension polygons being generated by defining vertices of the extension polygons using vertices of the basic polygon added to vectors defining the basic polygon having a magnitude based on said parameters; and a display which displays the image generated by the device which generates.

12. A display system according to claim 11, wherein the device which generates the image further includes:

means for generating the image which generates the extension reflection using surface qualities of the object which are included in the reflective properties of the object.

13. A display method, comprising the steps of:

storing data defining a three-dimensional object including a location of the object and reflective properties of the object, and data defining a light source including a location of the light source and illumination properties of the light source;

generating, using the data which has been stored, an image which includes a reflection off of the object, the reflection off of the object including both a basic reflection defined by a basic polygon and an extension reflection defined by a set of extension polygons, said set of extension polygons being generated by defining vertices of the extension polygons using vertices of the basic polygon added to vectors defining the basic polygon having a magnitude based on said parameters; and displaying the image generated by the generating step.

14. A display method according to claim 13, wherein the generating step includes:

generating the extension reflection using surface qualities of the object which are included in the reflective properties of the object.

\* \* \* \* \*

UNITED STATES PATENT AND TRADEMARK OFFICE
CERTIFICATE OF CORRECTION

PATENT NO. : 5,742,292
DATED : April 21, 1998
INVENTOR(S) : Katsuyuki MURATA

It is certified that error appears in the above-identified patent and that said Letters Patent is hereby corrected as shown below:

On the title page, Item [63] Related U.S. Application Data date is incorrect. It should read:

--Oct. 28, 1994--

Signed and Sealed this

Twenty-second Day of September, 1998

*Attest:*

BRUCE LEHMAN

*Attesting Officer*    *Commissioner of Patents and Trademarks*